United States Patent
Gross

(10) Patent No.: US 6,442,447 B1
(45) Date of Patent: Aug. 27, 2002

(54) NUMERICALLY CONTROLLED SURFACE PROCESSING MACHINE AND A METHOD FOR PREPARING A NUMERICALLY CONTROLLED SURFACE PROCESSING PROCESS

(75) Inventor: Andreas Gross, Wuppertal (DE)

(73) Assignee: Heinz Berger Maschinenfabrik GmbH & Co., Wuppertal (DE)

( * ) Notice: Subject to any disclaimer, the term of this patent is extended or adjusted under 35 U.S.C. 154(b) by 0 days.

(21) Appl. No.: 09/384,513

(22) Filed: Aug. 27, 1999

(51) Int. Cl.$^7$ .............................. G06F 19/00; G01B 7/28
(52) U.S. Cl. .................. 700/189; 700/184; 700/195; 702/168
(58) Field of Search ............................ 700/57, 86, 161, 700/163, 184, 187, 189, 195, 253; 702/167, 168

(56) References Cited

U.S. PATENT DOCUMENTS

| | | | | |
|---|---|---|---|---|
| 4,979,224 A | * | 12/1990 | Maiocco et al. ............. | 382/154 |
| 5,334,918 A | * | 8/1994 | McMurty et al. ....... | 318/568.16 |
| 5,428,548 A | * | 6/1995 | Pilborough et al. ......... | 700/195 |
| 5,726,896 A | * | 3/1998 | Jia et al. ..................... | 700/187 |
| 6,243,621 B1 | * | 6/2001 | Tao et al. ................... | 700/245 |

* cited by examiner

Primary Examiner—Leo Picard
Assistant Examiner—Elliot Frank
(74) Attorney, Agent, or Firm—Kilpatrick Stockton

(57) ABSTRACT

Numerically controlled surface processing wherein contour coordinates of a workpiece clamped in a clamping device are determined in a number of default positions by a sensor, and the coordinates are imaged point by point. Through interpolation of these coordinates, at least one continuous function for the contour profile of one coordinate is determined in one spatial direction from at least one other coordinate in a second spatial direction.

2 Claims, 2 Drawing Sheets

NUMERICALLY CONTROLLED SURFACE PROCESSING MACHINE AND A METHOD FOR PREPARING A NUMERICALLY CONTROLLED SURFACE PROCESSING PROCESS

FIELD OF THE INVENTION

The present invention pertains to a numerically controlled surface-processing machine for processing of workpieces, such as blades on knives, scissors, hand tools or the like, in particular it pertains to a grinding machine, a polishing machine or a lapping machine, with a clamping device for the workpieces and with a memory-programmable computer for the numerical control. In addition, the invention pertains to a method for preparation of a numerically controlled surface-processing process with a machine of this type.

BACKGROUND OF THE INVENTION

As a preparation for numerically controlled surface-processing, in particular for grinding of a workpiece, it is known how to prepare a working plan from the design drawing with a sequence of required processing steps. The working plan, which contains the geometric information for the workpiece from the drawing, is converted into a control program, wherein the construction and technological conditions of the surface-processing machine to be used for the processing are taken into account in the form of a clamping and tool plan. A program of this kind is prepared according to defined programming rules that are standardized internationally, e.g., by German Standard DIN 66025. This preparation of the numerically controlled surface-processing is very complicated. In certain processing jobs, e.g., the processing of rough blanks from a supplier, a design drawing may not be available in a timely manner, if at all, under certain circumstances. In this case, the supplied rough blanks must be measured first, and any potential tolerance problems must be taken into account. Another problem is that parts to be processed with identical contours may require a different control program in case of a slight deviation in the clamping, e.g., in their angular position with respect to the machine table.

During machine programming of the grinding, polishing or lapping, the programmer inputs the geometric and technological information into the system using a high-level programming language. From this data, the system, e.g., a memory-programmable computer of the system, calculates the corresponding subroutine with the various alignment and operating movements. Here, too, the step of information input is particularly complicated and time-intensive. The preparation for the work thus places strict demands on the qualification of the operator of the machine.

The present invention is based on the problem of improving a numerically controlled surface-processing machine of the stated kind and of improving the known method for preparation of a numerically controlled surface-processing process in such a way that the preparation for grinding can be simplified and shortened, while ensuring a good operating accuracy of the machine.

According to the invention, this is achieved with regard to the machine through the use of a numerically controlled surface-processing machine for processing of workpieces such as blades on knives, scissors, hand tools or the like, in particular for a grinding machine, a polishing machine or a lapping machine, which features the following components and characteristics:

a memory-programmable computer for numerical control,
a clamping device for the workpieces,
a sensor located at a distance from the clamping device,
wherein the sensor and the clamping device are controlled so that they can move relative to each other for acquisition of contour coordinates of a workpiece clamped in the clamping device in at least one spatial direction into a number of predefined positions,
a control device coupled to the sensor for processing of the determined coordinates that comprises:
a memory for point-by-point imaging of the coordinates,
means for interpolation of the determined coordinates in order to generate at least one continuous function for the contour profile of one coordinate in one spatial direction from at least one other coordinate in a second spatial direction,
an interface between the control device coupled with the sensor and the memory-programmable computer for transfer of the continuous function for the numerical control.

With regard to the aspect of technological manufacture, the problem underlying the invention is solved by a method for preparation of a numerically controlled surface processing process for workpieces, such as blades on knives, scissors, hand tools or the like, on a numerically controlled surface-processing machine that features a clamping device for the workpieces and a memory-programmable computer for the numerical control. Contour coordinates of a workpiece clamped in the clamping device are determined in a number of default positions by a sensor, and by means of a control device coupled with the sensor for processing of the determined coordinates, the coordinates are imaged point by point. Through interpolation of these coordinates, at least one continuous function for the contour profile of one coordinate is determined in one spatial direction from at least one other coordinate in a second spatial direction. This function is passed as an input parameter to the memory-programmable computer.

The machine according to the invention and the method according to the invention are thus designed for so-called workshop programming, and the final form of the program for numerical control of the grinding is defined by the operator of the machine. The workpiece geometry (contour) is acquired point by point by means of the sensor in the form of coordinates that are processed in the control device connected to the sensor to form at least one continuous function for the contour profile of one coordinate in one spatial direction from at least one other coordinate of a second spatial direction, and this is input, together with the point-wise function, into the memory-programmable computer for the numerical control via the interface. Thus, the preparation of the numerically controlled grinding of a new workpiece requires only little additional machine operating time so that the grinding machine according to the invention can also be used with high efficiency for single production and small batch production of workpieces with complicated contours, e.g. curved in all three spatial directions.

The memory-programmable computer can be designed so that the continuous function is saved directly as a desired value for the numerical control. In this case, a finished workpiece with a final contour to be manufactured can be clamped in the clamping device. Presuming that the workpieces to be processed next generally coincide in fundamental geometry and in clamping orientation with the finished workpiece, the grinding can be carried out by means of repetition of the stored desired value or of the control program that was prepared for the finished part.

Another possibility consists in designing the memory-programmable computer so that the continuous function is first stored as an actual value of the contour of the clamped tool, and then preferably, the function can be modified—for example, as described in detail below—interactively into a desired-value function.

The invention will be explained in greater detail based on one embodiment example illustrated in the attached drawing illustrating a surface-processing machine and method.

DETAILED DESCRIPTION OF PREFERRED EMBODIMENT

Figure 1A:
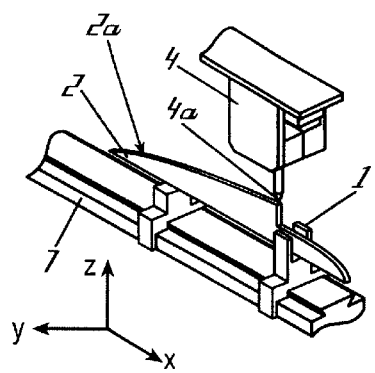
FIGS. 1a, 1b, and 1c are partial perspective illustrations showing various positions of a sensor for a surface-processing machine according to the invention, in particular a grinding machine according to the invention, which is located over a workpiece clamped in a clamping device of the grinding machine according to the invention.

In the different figures of the drawing, the same parts are always assigned the same reference numbers, so that as a rule, they will only be described once.

As seen initially in FIG. 1, for processing of workpieces such as blades on knives, scissors, hand tools or the like, a numerically controlled surface-processing machine according to the invention, such as the illustrated, grinding machine according to the invention, has a clamping device 1 for the workpieces 2 to be ground (a knife blade in FIGS. 1a to 1c), a memory-programmable computer 3 for the numerical control (FIG. 1d) and a sensor 4 that can move at least in one spatial direction (x, y, z). The sensor 4 is located at a distance to the clamping device.

Figure 1B:
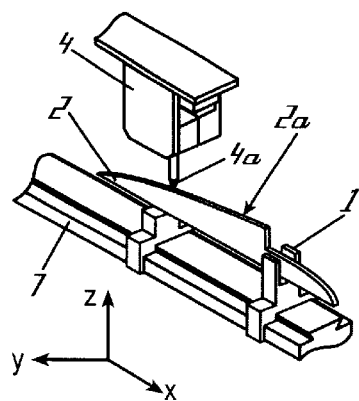
Figure 1C:
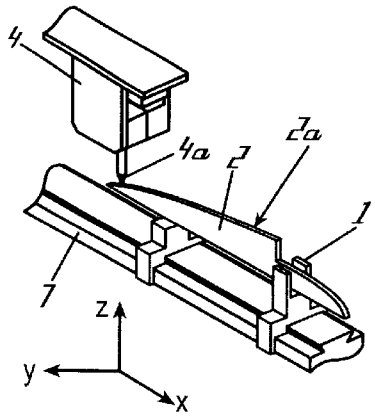

The illustrated sensor 4 can move, in particular, in at least two spatial directions x, z relative to the clamping device 1, and it is designed as a displaceable sensor, and it can move relative to the clamping device 1 into a certain number of predefined, linearly sequential positions $x_i$ (when projected in one spatial direction x), to measure the coordinates $x_i$, $z_i$ of a contour 2a of the workpiece 2 clamped in the clamping device 1. Preferably the clamping device 1 is moved while the sensor 4 is held in place. However, the reverse case is also possible. Three different positions $x_i$ of the sensor are illustrated in FIGS. 1a to 1c. To determine the coordinates $x_i$, $z_i$, the relative position of sensor 4 and clamping device 1 is changed in the spatial direction z (height) and a sensor head 4a of the sensor 4 is moved along the contour 2a of the workpiece clamped in the clamping device 1. The sensor 4 generates a signal dependent on the location of the contour 2a of the clamped workpiece 2 for the coordinate $z_i$ at each of the positions $x_i$ depending on the position of the sensor head 4a. (The index i in this case denotes a sequence number 0, 1, 2, 3 . . . for the particular coordinate, which is the same for x and y in the illustrated case.) This kind of design of the grinding machine according to the invention is very simple and easy to operate.

A relative movement of the sensor 4 and clamping device 1 in the spatial direction z (height) is not absolutely necessary to realize the invention. It is also possible that the sensor 4 is a contactless operating sensor, for example, an optical (e.g., a camera), acoustic, capacitive or inductive sensor, wherein the determination of the coordinate $z_i$ for the movement in the spatial direction z (height) can be omitted.

For more complex applications, i.e., in particular for workpieces 2 with a more complicated contour, such as curved surgical scissors, in order to determine the coordinates $x_i$, $y_k$, $z_n$ of the contour 2a of the workpiece 2 clamped in the clamping device 1, it is also possible to move in two spatial directions x, y; x, z; y, z to a number of predefined positions $x_i$, $y_k$, $z_n$ and then to determine the third (still missing) coordinate $x_i$, $y_k$, or $z_n$, by means of the sensor 4. (The indices i, k, n denote sequence numbers 0, 1, 2, 3 . . . for the particular coordinate, which can be different for x, y and z.)

The grinding machine according to the invention furthermore has a control device 5 connected to the sensor 4 for processing of the determined coordinates $x_i$, $y_k$, $z_n$. This is not illustrated in FIG. 1, but it is indicated in the schematic illustration in FIG. 2. In turn, the control device 5 is composed of a memory 5a for point-by-point imaging of the coordinates $x_i$, $y_k$, $z_n$ and means 5b (for example, a processor) for interpolation of the determined coordinates $x_i$, $y_k$, $z_n$, in order to obtain at least one continuous function—but in the illustrated case z(x) also for other and more complex cases z(y), z(x,y), y(x), y(z), y(x,z), x(y), x(z), x(y,z)—of the contour profile of one coordinate $x_i$, $y_k$, $z_n$ in one spatial direction x, y, z from at least one other coordinate $z_n$, $y_k$, $x_i$ in a second spatial direction z, y, x. Furthermore, FIG. 2 shows an interface 5c between the control device 5 connected to the sensor 4, and the memory-programmable computer 3, which is used for transfer of the continuous function z(x) (or z(y), z(x,y), y(x), y(z), y(x,z), x(y), x(z), x(y,z)) for the numerical control.

As already mentioned, the memory-programmable computer 3 can be designed so that the continuous function z(x), z(y), z(x,y), y(x), y(z), y(x,z), x(y), x(z), x(y,z) can be stored at appropriate memory locations as a set value for the numerical control. In this case, a finished workpiece 2 having the end contour 2a to be produced, can be clamped in the clamping device 1 and all subsequent workpieces 2 to be ground can be processed by using this set value as a basis for the program of the numerically controlled machine.

Memory-programmable computers 3 used today for numerically controlled machines usually feature a hardware configuration that is dependent on the production method and the type of machine so that preferably the control device 5 can be integrated directly into the memory-programmable computer 3 for the numerical control for processing of the determined coordinates $x_i$, $y_k$, $z_n$. Thus, the invention can also be used quite easily on different numerically controlled grinding machine, such as, e.g., a dual-axis CNC edge grinding machines, a four-axis CNC hollow grinding machine for knives or a five-axis CNC surface grinding machine for highly curved workpieces. Also, existing numerically controlled grinding machines can be retrofitted according to the invention without significant expense.

Furthermore, the memory-programmable computer 3 can be designed in such a manner that the continuous function z(x), z(y), z(x,y), y(x), y(z), y(x,z), x(y), x(z), x(y,z) can be stored at appropriate memory locations as an actual value of the contour 2a of the clamped tool 2. With the determined contour 2a, the movement path (working movements of grinding heads or grinding spindles, adjustment movements of grinding cylinders, etc.) of the grinding machine can be calculated for grinding, in accordance with a program stored in the memory-programmable computer 3.

Figure 1D:
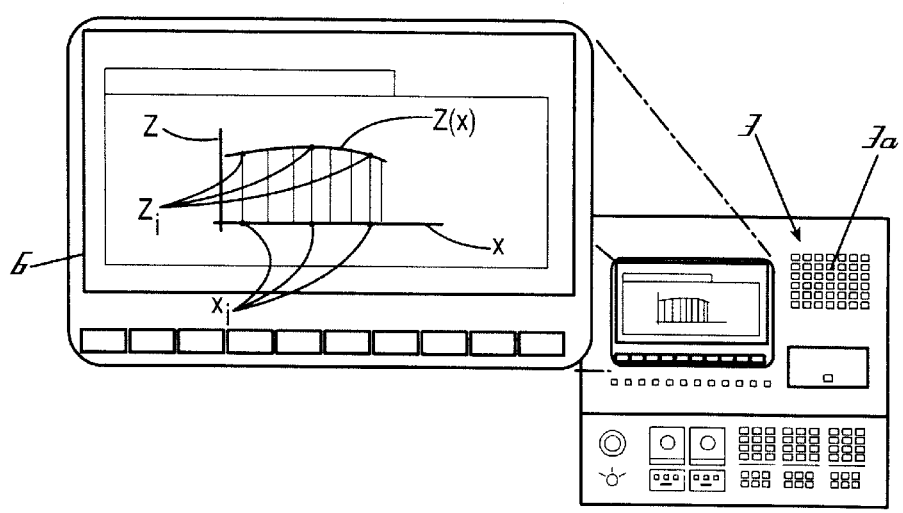
FIG. 1(d) shows a memory-programmable computer including a monitor, for practicing the invention.
Figure 2:
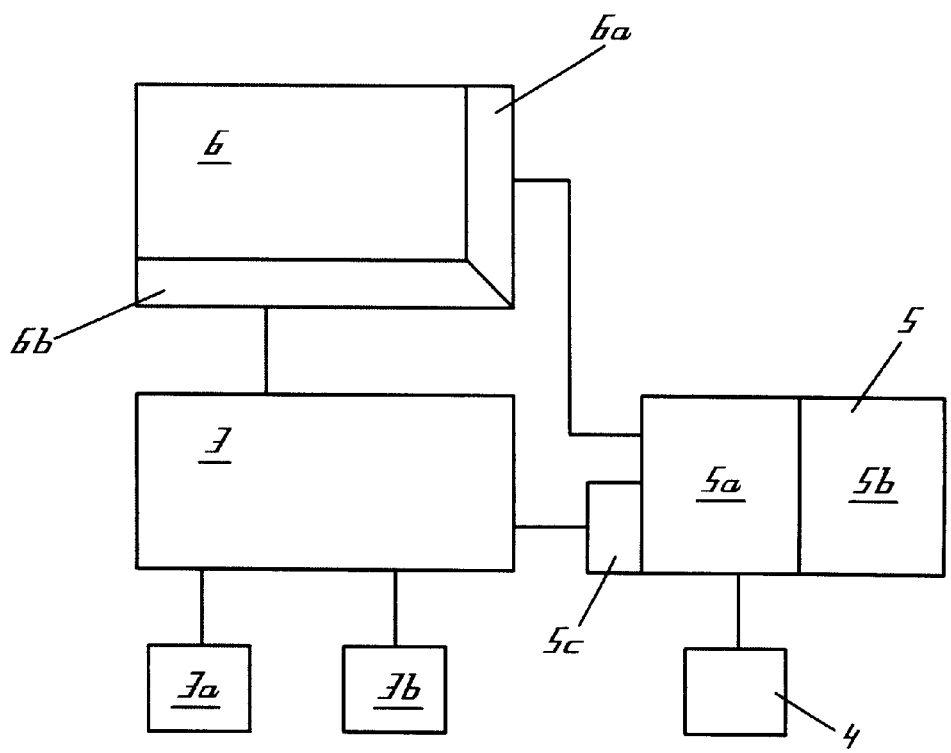
FIG. 2 shows a schematic illustration of the essential components of the surface-processing machine according to the invention.

In this case, it is also a particular advantage if the grinding machine according to the invention has a monitor 6 (as illustrated in FIGS. 1 and 2) with an interface 6a to the control device 5 connected to the sensor 3, so that the determined coordinates $x_i$, $y_k$, $z_n$ of the contour 2a of the workpiece 2 clamped in the clamping device 1, and the continuous function z(x), z(y), z(x,y), y(x), y(z), y(x,z), x(y), x(z), x(y,z) can be displayed on the monitor 6, as indicated in FIG. 1d.

If the monitor 6 has an interface 6b to the memory-programmable computer 3 for the numerical controller, then it can be configured in such a manner that an interactive change in the determined coordinates $x_i$, $y_k$, $z_n$ of the contour and of the continuous function z(x), z(y), z(x,y), y(x), y(z), y(x,z), x(y), x(z), x(y,z) can be implemented.

By the use of suitable input means for the memory-programmable computer 3, such as a keyboard 3a and/or a mouse 3b, it is then possible in accordance with the profile of the continuous function z(x), z(y), z(x,y), y(x), y(z), y(x,z), x(y), x(z), x(y,z) displayed on the monitor 6, and the displayed coordinates xi, $y_k$, $z_n$, to make changes to the values of the coordinates $x_i$, $y_k$, $z_n$ and then the continuous function z(x), z(y), z(x,y), y(x), y(z), y(x,z), x(y), x(z), x(y,z) can be updated and displayed on the monitor 6. Thus, a set-value curve for the numerically controlled grinding process of the contour 2a of the clamped workpiece 2 can be produced, which can then be stored at appropriate memory locations of the computer 3.

With regard to the operating mode of the means 5b for interpolation for generating the continuous function z(x), z(y), z(x,y), y(x), y(z), y(x,z), x(y), x(z), x(y,z) of the contour profile, it should also be stated that this procedure can be performed in a particularly efficient manner when the values of the linearly sequential positions $x_i$ are support points (see display on the monitor 6 in FIG. 1d) The values of the coordinates $z_i$ at the location of the contour 2a of the clamped workpiece 2 are dependent support values forming a mathematical approximation, where in particular the support points are equidistant in a linear profile of the contour 2a, and their mutual spacing decreases with increasing curvature of the contour 2a in order to improve the accuracy of the determination of the continuous function z(x), z(y), z(x,y), y(x), y(z), y(x,z), x(y), x(z), x(y,z) of the contour profile and in order to optimally set the amount of data to be evaluated in the interpolation.

The means 5b for interpolation of the determined coordinates $x_i$, $y_k$, $z_n$ to obtain the continuous function z(x), z(y), z(x,y), y(x), y(z), y(x,z), x(y), x(z), x(y,z) can be based on a mathematical approximation by means of an interpolation polynomial. To ensure high accuracy, in particular a fourth degree interpolation polynomial, e.g., in the form $$x=ax^4+bx^3+cx^2+dx+e$$

has proven to be optimum. The determination of individual coefficients a, b, c, d, e can be performed preferably according to an already known numerical method.

Figure 3:
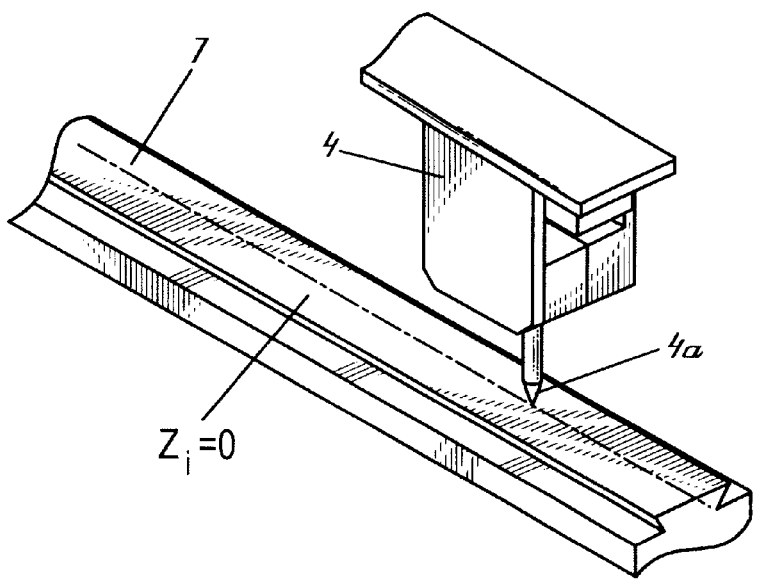
FIG. 3 shows a perspective illustration showing the sensor and a machine table for the surface-processing machine according to the invention.

For the calibration that is required before the determination of the contour 2a of the clamped workpiece 2, the reader is referred to FIG. 3. For calibration it is necessary to define the zero line (e.g., $z_i$=0 in FIG. 3) for the particular spatial coordinates x, y, z. This can be done preferably by using the (e.g. horizontal) assembly plane of a machine table 7, on which the clamping device 1 is mounted, as a reference basis so that the sensor 4 supplies the value zero (e.g., $z_i$=0) as to the signal for this assembly plane.

Due to the grinding machine according to the invention, the preparation for the grinding will not only be considerably simplified and abbreviated—even if no drawing is available—but in addition, the workpieces will be measured in the clamped position so that it will be possible to compensate for any inaccuracies in the clamping with no significant effort. The preparation for grinding can also be performed by one operator who has relatively lower qualifications since all the necessary steps for this procedure are easy to learn and to carry out.

The invention is not limited to the described embodiment examples, but rather it pertains to all equivalent embodiments with the essence of the invention. In general, the invention pertains to a surface-processing machine, i.e., it is only of subordinate importance whether a polishing disk or a lapping wheel is used as the processing tool.

The discussion above has pertained to a relative movement of sensor 4 and clamping device 1, and to a "movement into various positions," and thus this includes the possibility for active movement of the sensor 4, for example, of its sensing head 4a with a stopped clamping device 1, but on the other hand, it also includes the active movement of the clamping device 1 (moving on the machine table 7 with the clamped workpiece 2) with a stopped sensor 4.

Embodiments in which the spatial coordinates are not represented in a Cartesian system x, y, z—as described—but rather are represented as polar coordinates, also fall within the scope of the present invention.

In addition, a person skilled in the art can supplement the surface-processing machine according to the invention through additional, expedient technical means or by variations, without leaving the frame of the invention. It is possible, for example, to store various menus for the individual steps of preparation of the numerically controlled grinding in the memory-programmable computer 3, such as "calibration," "measure," "set-value determination," "actual-value determination," "set-value input" etc., which can then be displayed on the monitor 6 with the appropriate options.

It should be understood that the foregoing relates only to a preferred embodiment of the present invention, and that numerous changes and modifications thereof may be made without departing from the spirit and scope of the invention as defined in the following claims.

| | |
|---|---|
| 1 | Clamping device |
| 2 | Workpiece |
| 2a | Contour of 2 |
| 3 | Computer |
| 3a | Keyboard of 3 |
| 3b | Mouse of 3 |
| 4 | Sensor |
| 4a | Sensing head of 4 |
| 5 | Control device |
| 5a | Memory of 5 |
| 5b | Means for interpolation of 5 |
| 5c | Interface between 5 and 3 |
| 6 | Monitor |
| 6a | Interface between 5 and 6 |
| 6b | Interface between 5 and 6 |
| 7 | Machine table |
| a, b, c, d, e | Coefficients |
| i, k, n | Sequence numbers 0, 1, 2, 3 |
| x, y, z | Space axes, continuous function values |
| $x_i$, $y_k$, $z_n$ | Space coordinates, discrete points |

What is claimed is:

1. Numerically controlled surface-processing machine for processing of a workpiece, comprising:

memory-programmable computer (3) for numerical control;

a clamping device (1) for the workpiece (2);

a sensor (4) located at a distance from the clamping device (1), wherein the sensor (4) and the clamping device (1) are controlled for movement relative to each other in at least one spatial direction (x, y, z), for acquisition of contour coordinates ($x_i$, $x_k$, $z_n$) of the workpiece (2) clamped in the clamping device (1) into a number of predefined positions ($x_i$ or $y_k$ or $z_n$);

a control device (5) coupled to the sensor (4) for processing of the determined coordinates ($x_i$, $y_k$, $z_n$), the control device comprising:

a memory (5a) for point-by-point imaging of the coordinates ($x_i$, $y_k$, $z_n$) in order to generate at least one continuous function (z(x), z(y), z(x,y), y(x), y(z), y(x,z), x(y), x(z), x(y,z)) for the contour profile of one coordinate ($z_n$, $y_k$, $xi$) in one spatial direction (z, y, x) from at least one other coordinate ($x_i$, $y_k$, $z_n$) in a second spatial direction (x, y, z);

an interface (5c) between the control device (5) coupled with the sensor (4) and the memory-programmable computer (3) for transfer of the continuous function (z(x), z(y), z(x,y), y(x), y(z), y(x,z), x(y), x(z), x(y,z)) for the numerical control;

the sensor (4) and the clamping device (1) being movable in at least one spatial direction (x) relative to each other into a number of predetermined positions ($x_i$) located linearly one behind the other after projection in one spatial direction (x) in order to determine the coordinates ($x_i$, $z_i$) of the contour (2a) of the workpiece (2) clamped in the clamping device; and in each of the positions ($x_i$) the sensor creates a signal for one coordinate ($z_i$) that corresponds in one spatial direction (z) to the location of the contour (2a) of the clamped workpiece (2), and position-dependent signals of the coordinates (zi) are processed in the control device (5) coupled with the sensor (4);

means (5b) for interpolation of the determined coordinates ($x_j$, $y_k$, $z_n$) to create a steady curve profile z (x) of the coordinates ($z_i$) is created as a function of the predefined positions ($x_i$) on the basis of the values of the predefined positions ($x_i$) and the associated values of the coordinates ($z_i$) determined by the sensor (4); whereby the values of the positions ($x_i$) that lie linearly behind one another are interpolation points, and the values of the coordinates ($z_i$) that depend on the position of the contour of the clamped work piece are interpolation values for a mathematical approximation that is carried out with the aid of the means (5b) for interpolating the determined coordinates ($x_i$, $z_i$) of the contour progression, wherein the interpolation points are equidistant if the contour (2a) progresses linearly, and wherein the mutual distance between said interpolation points decreases as the curvature of the contour (2a) increases.

2. Method for preparation of a numerically controlled surface-processing process, on a numerically controlled surface-processing machine that includes a clamping device (1) for the workpieces (2) and a memory-programmable computer (3) for the numerical control, characterized in that coordinates ($x_i$, $y_k$, $z_n$) of the contour (2a) of a workpiece (2) clamped in the clamping device (1) are determined from a number of default positions ($x_i$ and/or $y_k$ and/or $z_n$) by a sensor (4), and by means of a control device (5) coupled with the sensor (4) for processing of the determined coordinates ($x_i$, $y_k$, $z_n$);

the coordinates are imaged point by point and by interpolation from the coordinates ($x_i$, $y_k$, $z_n$);

at least one continuous function (z(x), z(y), z(x,y), y(x), y(z), y(x,z), x(y), x(z), x(y,z)) of the contour profile of one coordinate ($z_n$, $y_k$, $x_i$) is determined in one spatial direction (z, y, x) from at least one other coordinate ($x_i$, $y_k$, $z_n$) in a second spatial direction (x, y, z);

this function is passed as an input parameter to the memory-programmable computer (3);

the sensor (4) and the clamping device are moved relative to each other in at least one spatial direction (x) into a number of defined positions ($x_i$) located linearly one behind the other in a projection in one spatial direction (x) to determine the coordinates ($x_i$, $z_i$) of the contour (2a) of the workpiece (2) clamped in the clamping device (1);

in each of these positions ($x_i$) a signal is generated for one coordinate ($z_i$) that corresponds in one spatial direction (z) to the location of the contour (2a) of the clamped workpiece (2), wherein the processing of the position-dependent signals of the coordinates ($z_i$) is performed in the control device (5) coupled with the sensor (4), and wherein through an interpolation carried out on the basis of the values of the default positions ($x_i$) and of the associated values, the coordinates ($z_i$) determined by the sensor (4) create a continuous curve profile z (x) of the coordinates ($z_i$) as a function of the default positions ($x_i$); and the values of the positions ($x_i$) located linearly one behind the other in a projection on one spatial direction (x) are support points, and the values of the coordinates ($z_i$) dependent on the position of the contour of the clamped workpiece are support values for a mathematical approximation for interpolation of the determined coordinates ($x_i$, $z_i$) of the contour profile, and the support points are equidistant in a linear profile of the contour (2a), and the mutual spacing between the support points decreases with increasing curvature of the contour (2a).

* * * * *